United States Patent
Lenhart

(10) Patent No.: US 6,391,810 B1
(45) Date of Patent: May 21, 2002

(54) LEAD- AND BARIUM-FREE CRYSTAL GLASS

(75) Inventor: Armin Lenhart, Neumkirchen a. Br. (DE)

(73) Assignee: F. X. Nachtmann Bleikristallwerke GmbH, Waldnaab (DE)

( * ) Notice: Subject to any disclaimer, the term of this patent is extended or adjusted under 35 U.S.C. 154(b) by 0 days.

(21) Appl. No.: 09/626,356

(22) Filed: Jul. 27, 2000

(30) Foreign Application Priority Data

Aug. 4, 1999 (DE) .......................... 199 36 699

(51) Int. Cl.$^7$ .......................... C03C 3/087; C03C 3/093; C03C 3/095; C03C 3/118
(52) U.S. Cl. .......................... 501/59; 501/64; 501/67; 501/70; 501/71; 501/900
(58) Field of Search .............................. 501/59, 64, 67, 501/70, 71, 72, 900

(56) References Cited

U.S. PATENT DOCUMENTS

| | | | |
|---|---|---|---|
| 5,434,111 A | * 7/1995 | Clement et al. | 501/63 |
| 5,468,693 A | * 11/1995 | Comte | 501/72 |
| 5,525,553 A | * 6/1996 | Brocheton et al. | 501/64 |
| 6,235,667 B1 | * 5/2001 | Paloschi et al. | 501/72 |
| 6,255,238 B1 | * 7/2001 | Brocheton | 501/56 |

FOREIGN PATENT DOCUMENTS

| WO | WO 92/19559 A | * 11/1992 |
|---|---|---|
| WO | WO 95/13993 A | * 5/1995 |

OTHER PUBLICATIONS

Volf, Chemical Approach to Glass, pp. 497–507, 1984.*

* cited by examiner

*Primary Examiner*—David Sample
(74) *Attorney, Agent, or Firm*—Jordan and Hamburg LLP

(57) ABSTRACT

Lead- and barium-free crystal glass for the manual or machine production of high-grade glass objects with a refractive index higher than 1.52 and a density of at least 2.45 g/cc, wherein the crystal glass comprises the following components in weight percent.

| | |
|---|---|
| $SiO_2$ | 59.0–71.0 |
| $TiO_2$ | 0.001–8.0 |
| $Al_2O_3$ | 0.01–4.0 |
| CaO | 2.0–10.0 |
| MgO | 0.5–8.0 |
| ZnO | 0.01–11.0 |
| $K_2O$ | 0.08–11.0 |
| $Na_2O$ | 3.0–15.5 |
| $Sb_2O_3$ or $As_2O_3$ | 0.001–1.5 |
| SrO | 0.001–0.1 |
| $B_2O_3$ | 0.01–3.0 |
| $Li_2O$ | 0.01–2.0 |
| $SO_4^{2-}$ | 0.0008–1.2 |
| $F^-$ | 0.008–0.2 | as well as at least two components selected from the group consisting of $Er_2O_3$, $Nd_2O_3$, $CeO_2$, CoO, $Pr_2O_3$, SeO, NiO and MnO and has a moisture content of 0.025 to 0.07% by weight.

7 Claims, No Drawings

LEAD- AND BARIUM-FREE CRYSTAL GLASS

The invention relates to a lead-and barium-free crystal glass for producing high-grade glass-objects with a refractive index higher than 1.52 and a density of at least 2.45 g/cc manually or mechanically.

Lead and barium are toxic in very small amounts. They are contained in conventional crystal glass and can be leached out after a short time from objects manufactured from such crystal glass and can reach the human organism. For this reason, there is increased interest in lead-and barium-free crystal glass. In order to replace the lead and barium, which are present in crystal glass in the form of PbO and BaO, $K_2O$ and/or ZnO are added in increased amounts to known lead-and barium-free crystal glasses, as described, for example, in the DE 43 03 474 C2. By these means, a lead- and barium-free crystal glass can be melted which, on the one hand, essentially has the physical and chemical properties of lead- and barium-containing crystal glass and on the other, complies with the legal requirements for lead- and barium-free crystal glass, namely, a refractive index higher than 1.52 and a density of at least 2.45 g/cc. Even though the physical and chemical properties of known lead- and barium-free crystal glasses essentially correspond to those of previously known lead- and barium-containing crystal glasses, this applies also to the processing conditions, that is, the melting and processing temperatures of now known lead- and barium-free crystal glasses also lie within the range of previously known "customary" crystal glasses. As a rule, the melting temperature is about 1450° C. and the -viscosity $hu=10^4$ dPas at temperatures above 1000° C. Accordingly, on the one hand, a necessary minimum viscosity must be reached so that the processability is adequate and, on the other, the glass temperatures should not be too high, with regard to the strain on the processing machines.

Furthermore, DE 693 20 994 T2 is named as state-of-the-art. From this publication, a lead- and barium-free crystal glass is known with a refractive index higher than 1.52. This glass is intended for hand-made or machine-made glassware for daily use with a high gloss and a high light transparency. The glass compositions, described there, are to be processed essentially under the processing parameters described above.

It is an object of the invention to indicate a lead- and barium-free crystal glass, which can be processed in an improved manner.

This can be accomplished with a lead- and barium-free crystal glass of the type named above, which is characterized by a composition in weight percent of

| | |
|---|---|
| $SiO_2$ | 59.0–71.0 |
| $TiO_2$ | 0.001–8.0 |
| $Al_2O_3$ | 0.01–4.0 |
| CaO | 2.0–10.0 |
| MgO | 0.5–8.0 |
| ZnO | 0.01–11.0 |
| $K_2O$ | 0.08–11.0 |
| $Na_2O$ | 3.0–15.5 |
| $Sb_2O_3$ or $As_2O_3$ | 0.001–1.5 |
| SrO | 0.001–0.1 |// -continued
| $B_2O_3$ | 0.01–3.0 |
| $Li_2O$ | 0.01–2.0 |
| $SO_4^{2-}$ | 0.0008–1.2 |
| $F^-$ | 0.008–0.2 | as well as at least two components from the group consisting of $Er_2O_3$, $Nd_2O_3$, $CeO_2$, CoO, $Pr2O_3$, SeO, NiO and MnO and having a moisture content of 0.025 to 0.07% by weight.

The inventive crystal glass with a higher water content ranging from 0.025 to 0.007% by weight has a viscosity, which is different appreciably from that of crystal glass with a lower water content. The water, which is incorporated in the glass structure in the form of silanol groups, causes the glass to have a viscosity at a particular temperature, which is lower than that of crystal glasses, which have a lesser water content. The glass thus becomes more fluid. This is associated with the appreciable advantage that there is increased heat radiation during the molding process of the glass that is to be processed, that is, the heat is dissipated more rapidly in the glass mold. Moreover, a more rapid cooling may be observed. Because of the lower viscosity, the machines can run more quickly, since the processable glass can be transported more rapidly through the machine. In other words, while retaining the previous processing temperatures, the glass can be processed more efficiently because of the lower viscosity achievable due to the increased water content. Alternatively, it is also possible to lower the processing temperature of the glass, since the usual processing viscosity of $h=10^4$ dPas is achieved at clearly lower temperatures. The temperature difference $DT>>x\cdot 10°$ C. depends, on the one hand, on the water content and, on the other, on the glass composition selected. In turn, this has an advantage is effect on the strain on the machine and, with that, on the service life.

The increase in the water content of the glass, proposed pursuant to the invention, can be achieved, on the one hand, by using oxygen heating for melting the glass composition, especially in conjunction with water-containing raw materials. As "moist" raw materials, NaOH, $Ca(OH)_2$, $Al(OH)_3$, $Na_2B_4O_7xH_2O$, etc. and the like may be used. An increase in the water content can be attained simply in conjunction with the water formed during the combustion of oxygen-rich heating gases. Alternatively, it is possible to increase the water content solely by oxygen heating by conducting the heating process appropriately. Finally, the possibility exists when an electric vat is used for melting the glass composition, to blow steam into the vat region and moisten the furnace atmosphere in this way. The water penetrates into the melt and is incorporated in it.

Of the glass components named above, $SiO_2$ acts as a network forming agent. $TiO_2$ has a chromophoric effect with regard to an Fe—Ti oxide complex that is formed and, in contrast to $SiO_2$, increases the refractive index.

$Al_2O_3$ increases the chemical stability and stabilizes the network. Furthermore, it decreases the corrosion of the vat.

CaO, MgO and SrO increase the chemical stability and affect the viscosity of the glass. CaO leads to a "short" glass. On the other hand, MgO and SrO bring about the formation of a "long" glass.

ZnO acts as an intermediate oxide and brings about an increase in the refractive index. $Li_2O$, $Na_2O$ and $K_2O$ have the function of a network converter (flux). Of these, $Li_2O$ brings about an increase in the refractive index.

$Sb_2O_3$ or $AS_2O_3$ are added as refining agents to reduce bubble and schlieren formation. The two are interchangeable.

$B_2O_3$ is a strong flux, which increases the chemical stability.

Finally, sulfate ($SO_4^{2-}$) is present. It also is a refining agent. In addition, a small amount of fluoride ($F^-$) is present, which decolorizes and interferes with the formation of the above-named Fe—Ti oxide complex. However, the $F^-$ content should remain small in view of the possible formation of HF gas in the vat. Moreover, the inventive glass contains at least two components selected from the group consisting of, in percent by weight

| | |
|---|---|
| $Er_2O_3$ | 0.00001–0.01 |
| $Nd_2O_3$ | 0.00001–0.01 |
| $CeO_2$ | 0.001–0.2 |
| CoO | 0.00001–0.01 |
| $Pr_2O_3$ | 0.00001–0.01 |
| SeO | 0.0001–0.02 |
| NiO | 0.00001–0.01 |
| MnO | 0.001–0.05 | these compounds being decolorizing agents. The objective is to obtain a clear and transparent glass. The role of praseodymium trioxide, in particular, should be mentioned. Because of its fluorescing properties, praseodymium has a slightly violet coloration and is normally added as a complementary color to Fe ions, which lead to a green coloration. In addition, if the praseodymium content is sufficiently high, its fluorescing property enables the glass as a whole to become slightly fluorescing. This contributes to the optics, since the glass then has a slight afterglow effect.

It is particularly appropriate if the water content is between 0.035 and 0.06% by weight.

It has also proven to be advantageous if the crystal glass contains 0.001–4.0% by weight of $La_2O_3$ and
0.001–3.0% by weight of SnO.

$La_2O_3$ brings about an increase in the refractive index. SnO acts as a refining agent and also reduces bubble and schlieren formation.

It has furthermore proven to be advantageous if the content of glass components, which function as decolorizing agents and of which two and preferably more are present for the production of a transparent, crystal clear glass, fall within the ranges of weight percent given below:

| | |
|---|---|
| $Er_2O_3$ | 0.00001–0.01 |
| $Nd_2O_3$ | 0.00001–0.01 |
| $CeO_2$ | 0.001–0.2 |
| CoO | 0.00001–0.01 |
| $Pr_2O_3$ | 0.00001–0.01 |
| SeO | 0.0001–0.02 |
| NiO | 0.00001–0.01 |
| MnO | 0.001–0.05 |

In the following three examples of inventive glasses, as well as the density j(g/cc), the refractive index $n_d$ at 589 nm, the temperatures of the viscosity steps h=$10^2$ dPas, h=$10^4$ dPas and h=$10^6$ dpas, as well as the Abbe No. n are given.

The water content of the glass was determined by means of IR spectroscopy. For this purpose, the IR absorption bands in the spectrum, characteristic of water, were evaluated. A Lamda-9 Perkin Elmer spectrophotometer was used. The density was determined with the Ceast sink-float device. The viscosity was determined by the Vogel-Fulcher-Tammann method.

Example 1

| Glass Components: | Content in % by weight |
|---|---|
| $SiO_2$ | 69.0880 |
| $TiO_2$ | 0.3000 |
| $Al_2O_3$ | 0.3000 |
| CaO | 5.7000 |
| MgO | 4.5000 |
| ZnO | 0.7000 |
| $K_2O$ | 1.4000 |
| $Na_2O$ | 14.1000 |
| $Sb_2O_3$ | 0.4000 |
| SrO | 0.1000 |
| $Fe_2O_3$ | 0.0200 |
| $B_2O_3$ | 1.8000 |
| $Li_2O$ | 0.5000 |
| $La_2O_3$ | 0.8000 |
| SnO | 0.3000 |
| $SO_4^{2-}$ | 0.0200 |
| $Cl^-$ | 0.0400 |
| $F^-$ | 0.0010 |
| $H_2O$ | 0.0300 |
| $Er_2O_3$ | 0.0002 |
| CoO | 0.0003 |
| $Pr_2O_3$ | 0.0001 |

Properties: density: 2.539 g/cc
refractive index: $n_d$=1.525 at 589 nm
viscosity h=$10^2$ dpas at 1,387° C.
viscosity h=$10^4$ dPas at 982° C.
viscosity h=$10^6$ dpas at 787° C.
properties: Abbe No. n: 59.1

As can be inferred from the Table, this glass had a water content of 0.03% by weight. The density of the glass composition was 2.539 g/cc and therefore is within the required range, as is the refractive index, which was determined to be 1.525. The measured temperatures for the viscosity steps h=$10^2$ dPas, h=$10^4$ dPas and h=$10^6$ dpas are clearly below the corresponding known comparison values. On the whole, especially the viscosity h=$10^4$ dpas, at which the processing usually takes place, is reached at a temperature of 982° C. In comparison to corresponding glass compositions, which do not have the increased water content, it was possible to determine temperature differences of 20° to 40° C. with respect to the viscosity steps named. For practical purposes, this means that, at the usual processing temperatures of more than 1000° C. of glasses pulled from the melt and supplied to the processing machines, the viscosity is even lower and a liquid glass is present. By these means, a higher machine throughput can be attained, the moldability of the glass is better because of the lower viscosity and the heat dissipation is also improved, so that, overall, more positive processing conditions result. Alternatively of course, there is also the possibility of supplying the glass to the machines at somewhat lower temperatures, at which the viscosity is at the processing level, so that the thermal strain there is less than before.

Example 2

| Glass Components: | Content in % by weight |
|---|---|
| SiO$_2$ | 66.8000 |
| TiO$_2$ | 4.3200 |
| Al$_2$O$_3$ | 0.6200 |
| CaO | 5.4900 |
| ZnO | 4.5000 |
| K$_2$O | 1.4300 |
| Na$_2$O | 13.5000 |
| As$_2$O$_3$ | 0.4600 |
| Fe$_2$O$_3$ | 0.0066 |
| B$_2$O$_3$ | 0.5800 |
| La$_2$O$_3$ | 1.1300 |
| SnO | 0.8800 |
| SO$_4^{2-}$ | 0.0010 |
| Cl$^-$ | 0.0200 |
| F$^-$ | 0.0200 |
| H$_2$O | 0.0400 |
| Nd$_2$O$_3$ | 0.0002 |
| Pr$_2$O$_3$ | 0.0003 |

Properties: density.: 2.598 g/cc
refractive index: n$_d$=1.5507 at 589 nm
viscosity h=10$^2$ dPas at 1,408° C.
viscosity h=10$^4$ dpas at 982° C.
viscosity h=10$^6$ dPas at 782° C.
properties: Abbe No. n: 49.75

Here also, the density of 2.598 g/cc, as well as the refractive index of 1.5507, are within the required range. With this glass composition also, the viscosity steps named are reached at sufficiently low temperatures with temperature differences ranging from 20° to 40° C. in comparison to compositions with a lower water content. This can be attributed to the increased water content of the given glass composition. In comparison to Example 1, As$_2$O$_3$ was used here as refining agent instead of Sb$_2$O$_3$. In addition, Nd$_2$O$_3$ and Pr$_2$O$_3$ were used as refining agents.

Example 3

| Glass Components: | Content in % by weight |
|---|---|
| SiO$_2$ | 66.051 |
| TiO$_2$ | 2.100 |
| Al$_2$O$_3$ | 1.400 |
| CaO | 8.400 |
| MgO | 2.500 |
| ZnO | 0.500 |
| K$_2$O | 4.900 |
| Na$_2$O | 13.140 |
| Sb$_2$O$_3$ | 0.400 |
| SrO | 0.200 |
| Fe$_2$O$_3$ | 0.009 |
| SnO | 0.400 |
| SO$_4^{2-}$ | 0.080 |
| Cl$^-$ | 0.050 |
| F$^-$ | 0.010 |
| H$_2$O | 0.050 |
| CeO$_2$ | 0.0001 |
| Pr$_2$O$_3$ | 0.0003 |
| NiO | 0.0001 |

Properties: density: 2.487 g/cc
refractive index: n$_d$=1.521 at 589 nm
viscosity h=10$^2$ dPas at 1,405° C.
viscosity h=10$^4$ dPas at 998° C.
viscosity h=10$^6$ dpas at 800° C.
properties: Abbe No. n: 53.58

Here also, the density of 2.487 and the refractive index of 1.521 are within the required range. With this glass also, the viscosity steps are reached at lower temperatures than they are with glasses that do not have an increased water content. The fact that the temperatures are higher than in the case of glasses of Examples 1 and 2, where the water content was lower, could be attributed to the different glass composition. For the glass of Example 3, Sb$_2$O$_3$ once again was used as refining agent; however, B$_2$O$_3$, Li$_2$O and La2O$_3$, which are present in the mixtures of Examples 1 and 2, were not present here. Furthermore, CeO$_3$, Pr$_2$O$_3$ and NeO were used as decolorizing agents. As with other mixtures, Fe$_2$O$_3$ is present as an impurity.

In summarizing, it may be noted that the crystal glass, consisting of the components described and having an increased water content, has better processing possibilities because of the advantageous effect on the viscosity properties, which can be utilized advantageously especially for the machine production of glass objects.

What is claimed is:

1. Lead- and barium free crystal glass for the manual or machine production of high-grade glass objects with a refractive index higher than 1.52 and a density of at least 2.45 g/cc, wherein the crystal glass comprises the following components, in weight percent

| | |
|---|---|
| SiO$_2$ | 59.0–71.0 |
| TiO$_2$ | 0.001–8.0 |
| Al$_2$O$_3$ | 0.01–4.0 |
| CaO | 2.0–10.0 |
| MgO | 0.5–8.0 |
| ZnO | 0.01–11.0 |
| K$_2$O | 0.08–11.0 |
| Na$_2$O | 3.0–15.5 |
| Sb$_2$O$_3$ or As$_2$O$_3$ | 0.001–1.5 |
| SrO | 0.001–0.1 |
| B$_2$O$_3$ | 0.01–3.0 |
| Li$_2$O | 0.01–2.0 |
| SO$_4^{2-}$ | 0.0008–1.2 |
| F$^-$ | 0.008–0.2 | and at least two components selected from the group consisting of Er$_2$O$_3$, Nd$_2$O$_3$, CeO$_2$, CoO, Pr$_2$O$_3$, SeO, NiO and MnO and has a moisture content of 0.025 to 0.07% by weight.

2. The lead- and barium-free crystal glass of claim 1, wherein the water content is between 0.035 and 0.06% by weight.

3. The lead- and barium-free crystal glass of claim 1, wherein the crystal glass also contains 0.001–4.0% by weight of La$_2$O$_3$ and 0.001–3.0% by weight of SnO.

4. The lead- and-barium-free crystal glass of and in percent by weight

| | |
|---|---|
| Er$_2$O$_3$ | 0.00001–0.01 |
| Nd$_2$O$_3$ | 0.00001–0.01 |
| CeO$_2$ | 0.001–0.2 |
| CoO | 0.00001–0.01 |
| Pr$_2$O$_3$ | 0.00001–0.01 |
| SeO | 0.0001–0.02 |

-continued

| | |
|---|---|
| NiO | 0.00001–0.01 |
| MnO | 0.001–0.05. |

5. The lead- and barium-free crystal glass of claim 1 comprising the following components in percent by weight:

| | |
|---|---|
| SiO$_2$ | 69.0880 |
| TiO$_2$ | 0.3000 |
| Al$_2$O$_3$ | 0.3000 |
| CaO | 5.7000 |
| MgO | 4.5000 |
| ZnO | 0.7000 |
| K$_2$O | 1.4000 |
| Na$_2$O | 14.1000 |
| Sb$_2$O$_3$ | 0.4000 |
| SrO | 0.1000 |
| Fe$_2$O$_3$ | 0.0200 |
| B$_2$O$_3$ | 1.8000 |
| Li$_2$O | 0.5000 |
| La$_2$O$_3$ | 0.8000 |
| SnO | 0.3000 |
| SO$_4^{2-}$ | 0.0200 |
| Cl$^-$ | 0.0400 |
| F$^-$ | 0.0010 |
| H$_2$O | 0.0300 |
| Er$_2$O$_3$ | 0.0002 |
| CoO | 0.0003 |
| Pr$_2$O$_3$ | 0.0001. |

6. The lead- and barium free crystal glass of claim 1 comprising the following components in percent by weight:

| | |
|---|---|
| SiO$_2$ | 66.8000 |
| TiO$_2$ | 4.3200 |
| Al$_2$O$_3$ | 0.6200 |
| CaO | 5.4900 |
| ZnO | 4.5000 |
| K$_2$O | 1.4300 |

-continued

| | |
|---|---|
| Na$_2$O | 13.5000 |
| As$_2$O$_3$ | 0.4600 |
| Fe$_2$O$_3$ | 0.0066 |
| B$_2$O$_3$ | 0.5800 |
| La$_2$O$_3$ | 1.1300 |
| SnO | 0.8800 |
| SO$_4^{2-}$ | 0.0010 |
| Cl$^-$ | 0.0200 |
| F$^-$ | 0.0200 |
| H$_2$O | 0.0400 |
| Nd$_2$O$_3$ | 0.0002 |
| Pr$_2$O$_3$ | 0.0003. |

7. The lead- and barium-free crystal glass of claim 1 comprising the following components in percent by weight:

| | |
|---|---|
| SiO$_2$ | 66.051 |
| TiO$_2$ | 2.100 |
| Al$_2$O$_3$ | 1.400 |
| CaO | 8.400 |
| MgO | 2.500 |
| ZnO | 0.500 |
| K$_2$O | 4.900 |
| Na$_2$O | 13.140 |
| Sb$_2$O$_3$ | 0.400 |
| SrO | 0.200 |
| Fe$_2$O$_3$ | 0.009 |
| SnO | 0.400 |
| SO$_4^{2-}$ | 0.080 |
| Cl$^-$ | 0.050 |
| F$^-$ | 0.010 |
| H$_2$O | 0.050 |
| CeO$_2$ | 0.0001 |
| Pr$_2$O$_3$ | 0.0003 |
| NiO | 0.0001. |

* * * * *

UNITED STATES PATENT AND TRADEMARK OFFICE
CERTIFICATE OF CORRECTION

PATENT NO.     : 6,391,810 B1
DATED          : May 21, 2002
INVENTOR(S)    : Armin Lenhart It is certified that error appears in the above-identified patent and that said Letters Patent is hereby corrected as shown below:

<u>Title page,</u>
Item [75], please correct the residence of the inventor as follows:
"[75]  Inventor:    Armin Lenhart, Neumkirchen a. Br.  (DE)" to
-- [75]  Inventor:    Armin Lenhart, Neunkirchen a. Br.  (DE) --.

Signed and Sealed this

Eighth Day of October, 2002

*Attest:*

*Attesting Officer*

JAMES E. ROGAN
*Director of the United States Patent and Trademark Office*